Nov. 8, 1966     L. E. ALVEY ETAL     3,283,626

TOOL BLOCK

Filed April 14, 1964

INVENTORS.
LEROY E. ALVEY
BY JESSE W. MENDENHALL

ATTORNEY.

United States Patent Office 3,283,626
Patented Nov. 8, 1966

3,283,626
TOOL BLOCK
Leroy E. Alvey, Bridgeport, and Jesse W. Mendenhall, Fairfield, Conn., assignors to The Bullard Company, Bridgeport, Conn., a corporation of Connecticut
Filed Apr. 14, 1964, Ser. No. 359,735
9 Claims. (Cl. 82—36)

This invention relates to machine tools, and particularly to an improved tool block for holding a cutting tool and having the capacity to very precisely adjust the cutting tip of the tool.

During the machining of metals, the cutting tips of tools become dull, requiring sharpening and adjustment to the precise location they originally obtained. Also, in cutting dense metals, deflection of the tool shank often requires precise adjustment of the cutting edge of the tool, particularly when precision work is being performed.

Heretofore, such adjustments required complex settings of gauge means on the machine tool to effect these adjustments, entailing substantial "down time" of the machine tool.

The principal object of the present invention is to provide a tool block for a cutting tool in which both axial and transverse precise adjustments of the cutting edge of the tool can be effected without requiring any substantial amount of "down time" of the machine tool to which it is attached.

Another object of the invention is to provide such a tool block in which separate eccentric means is employed to adjust the cutting edge of the tool both axially and transversely.

Still another object of the invention is to provide such a tool block in which the eccentric means for axial adjustment cooperates with the eccentric means for transverse adjustment.

Still another object of the invention is to provide such a tool block in which the cutting edge of a tool can be precisely adjusted transversely without substantially affecting its longitudinal position.

In one aspect of the invention, the tool block may comprise a base having means such as a dovetail construction for removably fastening said base to a slide or saddle of a machine tool. A tool support may comprise an elongated member pivotally attached to the base near its one end by a screw threaded into a threaded hole in the base. The screw may include an eccentric portion that cooperates with a passage within the tool support so that upon oscillation of the screw, the tool support moves longitudinally of the base throughout the extent of the throw of the eccentric. Spring washers may be located on the screw to provide friction between the tool support and base so as to control the displacement of the former with a high degree of precision.

In another aspect of the invention, a pin may be mounted in the base and it may extend through an enlarged hole in the tool support. The pin may include a flat surface for cooperating with a precision gauge mounted permanently on the tool support. Accordingly, longitudinal movement of the tool support relatively to the base can be indicated with extreme precision.

In a further object of the invention, another screw may be threaded into the base, near the end opposite that referred to above. This screw extends through an enlarged hole in the tool support and also includes an eccentric portion that cooperates with a passage in an element that is slidingly mounted between ways that permit its movement longitudinally but not transversely of the tool support. The eccentric of this screw is such that upon oscillation of the screw, the tool support is moved about the above-referred-to pivotal connection between the tool support and base. Spring washers are also employed on this lower eccentric screw to provide control of its movement.

In a still further aspect of the invention, the shank of a cutting tool may be mounted within a recess in the tool support and rigidly held in a roughly adjusted position.

In still another aspect of the invention, a pin may be mounted within the base and it may extend through an enlarged hole in the tool support and include a flat surface in position to cooperate with another precision gauge permanently mounted on the tool support for precisely indicating transverse movement of the tool tip. This pin should be located midway between the upper pivot point of the tool support and the cutting tip so that twice the indication on the gauge indicates the cutting tip movement.

In still another aspect of the invention, another screw may extend through an enlarged hole in the tool support near the tool end thereof and may be threaded to the base. Spring washers also may be used on this screw to provide a locking means to maintain the tool support in its finally precisely adjusted position.

The above, other objects and novel features of the invention will become apparent from the following specification and accompanying drawing which are merely exemplary.

Figure 1:
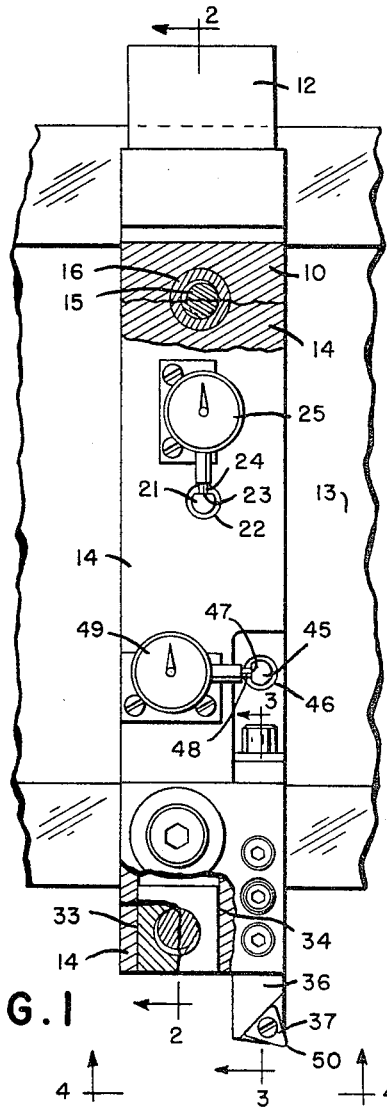
FIG. 1 is a front elevational view of a tool block to which the principles of the invention have been applied.
Figure 2:
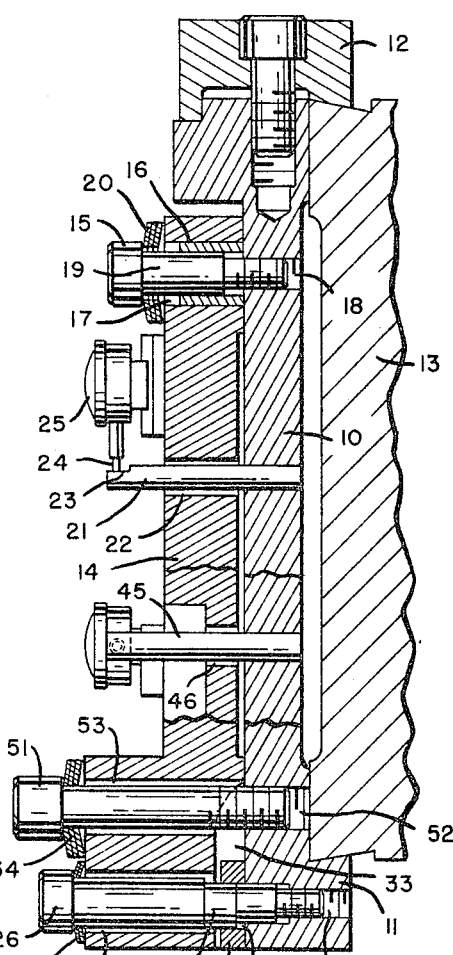
FIG. 2 is a sectional view taken substantially along line 2—2 of FIG. 1.

Referring to the drawing, the principles of the invention are shown as applied to a tool block including a base 10 which may include one half of a dovetail construction 11 at its one end and a removable half 12 at its other end for removably attaching the base to a slide 13 of a machine tool. The slide 13 is adapted to be moved along intersecting paths by means (not shown) as is well known in the art.

A tool support 14 may be pivotally connected to the base 10 by a screw 15 that extends through a bushing 16 within a hole 17 in support 14. The screw 15 may be threaded into a threaded hole 18 in base 10 and may include an eccentric portion 19 that cooperates with bushing 16 in a manner to effect longitudinal movement of support 14 when screw 15 is turned a limited amount in both directions. Spring washer means 20 may be employed between support 14 and the head of screw 15 to provide a releasable locking arrangement.

A pin 21 may be fixed in base 10 and it may extend through an opening 22 in support 14 that is larger than the pin by more than the eccentricity of the eccentric portion 19. Pin 21 may include a flat surface 23 that cooperates with a finger 24 of a precision gauge 25 that is permanently fixed to support 14. Accordingly, turning screw 15 a limited amount in either direction will move the support 14 longitudinally, and such movement can be indicated on gauge 25.

Another screw 26 may be threaded into a threaded hole 27 in base 10 at the end thereof opposite screw 15. It may extend through an enlarged hole 28 in tool support 14, and spring washers 29 may be located between support 14 and the head of screw 26 for the same reason that spring washers 20 are employed. Screw 26 may include an eccentric portion 30 that cooperates with a hole 31 in a rectangular-shaped element 32. The element 32 is mounted between ways 33, 34 (FIG. 4) of a slot formed in support 14. Accordingly, turning of screw 15 resulting in longitudinal movement of support 14 causes the element 32 to assume different locations along the slot having ways 33, 34. However, turning screw 26 in either direction a limited amount pivots support 14 about screw 15 for a purpose to be described later.

Figure 4:
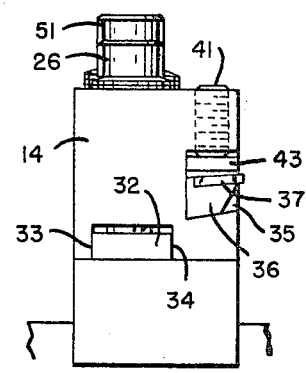
FIG. 4 is a view along line 4—4 of FIG. 1.
Figure 3:
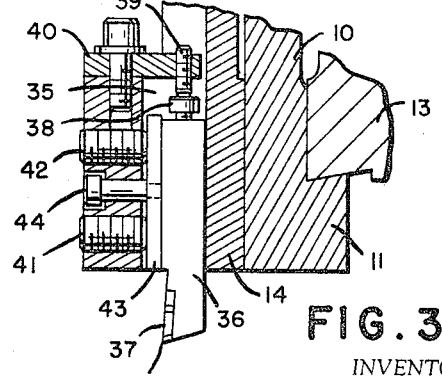
FIG. 3 is a sectional view taken substantially along line 3—3 of FIG. 1.

Referring to FIGS. 1, 3 and 4, support 14 is provided with a recess 35 within which the shank of a tool 36 is adapted adjustably to be mounted. Tool 36 may be provided with a "throw-away" tip 37 or a permanent cutting tip. The shank of tool 36 may be provided with an adjustable abutment 38 at its end opposite tip 37, and a set screw 39 in a bracket 40 extending into recess 35 may be employed to roughly adjust the location of tool 36 within recess 35. The tool 36 may be fixed in position in recess 35 by screws 41 and 42 that act on a shoe 43 held within recess 35 by a pin 44.

A pin 45 may be fixed in base 10 and it may extend through an enlarged hole 46 in support 14. It may include a flat surface 47 for cooperation with the finger 48 of a precision gauge 49 permanently fixed to the support 14. Pin 45 preferably is located midway between screw 15 and the edge 50 of tip 37. The construction is such that the turning of screw 26 in either direction a limited amount moves point 50 twice as far as the gauge 49 indicates.

In order to lock support 14 in adjusted position, another screw 51 is threaded into a threaded hole 52 in base 10. Screw 51 may extend through an enlarged hole 53 within support 14, and spring washers 54 may be employed to provide sufficient friction between support 14 and base 10 to maintain support 14 in adjusted position.

Although the various features of the improved tool block have been shown and described in detail to fully disclose one embodiment of the invention, it will be evident that changes may be made in such details and certain features may be used without others without departing from the principles of the invention.

What is claimed is:

1. In a tool block, a base; a tool support; a tool mounted in said tool support; a screw extending from said base through a hole in said support at its one end and including an eccentric portion that cooperates with said tool support to move said support longitudinally relative to said base when said screw is turned in either direction; another screw extending from said base, at the end thereof opposite said first mentioned screw, and through an enlarged hole within said support; an eccentric portion on said other screw; a longitudinal slide element in said tool support adapted to cooperate with the eccentric portion on said other screw, the construction being such that turning said other screw in both directions adjusts said tool support transversely of said base.

2. In a tool block, a base; a tool support; a tool mounted in said tool support; a screw extending from said base through a hole in said support at its one end and including an eccentric portion that cooperates with said tool support to move said support longitudinally relative to said base when said screw is turned in either direction; another screw extending from said base, at the end thereof opposite said first mentioned screw, and through an enlarged hole within said support; an eccentric portion on said other screw; a longitudinal slide element in said tool support adapted to cooperate with the eccentric portion on said other screw, the construction being such that turning said other screw in both directions adjusts said tool suport transversely of said base; and means for adjustably locking said tool support in adjusted position on said base.

3. In a tool block, a base; a tool support; a tool mounted in said tool support; a screw extending from said base through a hole in said support at its one end and including an eccentric portion that cooperates with said tool support to move said support longitudinally relative to said base when said screw is turned in either direction; another screw extending from said base, at the end thereof opposite said first mentioned screw, and through an enlarged hole within said support; an eccentric portion on said other screw; a longitudinal slide element in said tool support adapted to cooperate with the eccentric portion on said other screw, the construction being such that turning said other screw in both directions adjusts said tool support transversely of said base; and gauge means for precisely indicating the movement of said tool support both longitudinally and transversely of said base.

4. In a tool block, a base; a tool support; a tool mounted in said tool support; a screw extending from said base through a hole in said support at its one end and including an eccentric portion that cooperates with said tool support to move said support longitudinally relative to said base when said screw is turned in either direction; another screw extending from said base, at the end thereof opposite said first mentioned screw, and through an enlarged hole within said support; an eccentric portion on said other screw; a longitudinal slide element in said tool support adapted to cooperate with the eccentric portion on said other screw, the construction being such that turning said other screw in both directions adjusts said tool support transversely of said base; and separate gauge means permanently attached to said tool block for precisely indicating the movement of said tool support both longitudinally and transversely of said base.

5. In a tool block, a base; a tool support; a tool mounted in said tool support; a screw extending from said base through a hole in said support at its one end and including an eccentric portion that cooperates with said tool support to move said support longitudinally relative to said base when said screw is turned in either direction; another screw extending from said base, at the end thereof opposite said first mentioned screw, and through an enlarged hole within said support; an eccentric portion on said other screw; a longitudinal slide element in said tool support adapted to cooperate with the eccentric portion on said other screw, the construction being such that turning said other screw in both directions adjusts said tool support transversely of said base, gauge means mounted on said tool support for indicating the longitudinal movement of said support relative to said base; and other gauge means mounted on said tool support for indicating the transverse movement of said support relative to said base, said other gauge means being located substantially midway between said first mentioned screw and the cutting edge of said tool.

6. In a tool block; a base; a tool support; a tool mounted in said tool support; first rotatable means extending from said base through a hole in said support at one end thereof and including a first eccentric portion that cooperates with said tool support to move said support substantially longitudinally relative to said base when said first rotatable means is rotated in either direction; second rotatable means between said base and said support including a second eccentric portion for pivotally moving said support transversely of said base when said second rotatable means is rotated in either direction; and slide means cooperatively engaging said second rotatable means for allowing said support to be moved longitudinally of said base by rotation of said first rotatable means while maintaining said second rotatable means rotationally stationary.

7. In a tool block; a base; a tool support pivotally mounted adjacent one end thereof on said base; a tool adjustably attached to said support; means extending from said base through an enlarged hole in said support adjacent the end opposite that at which said support is pivotally mounted, said means having an eccentric portion; and a longitudinally movable slide element in said tool support adapted to cooperate with said eccentric portion, the construction being such that when said eccentric portion is rotated said tool support will be adjusted transversely of said base about said pivot mounting and said slide will move longitudinally with respect thereto.

8. In a tool block the combination as in claim 7 wherein said pivot mounting comprises rotatable means extending from said base through a hole in said support including an eccentric portion that cooperates with said tool support to move said support longitudinally relative to said base when said portion is rotated.

9. In a tool block the combination as in claim 8 wherein precision gauge means are provided on said tool support for indicating adjustments thereof responsive to both said eccentric portions.

References Cited by the Examiner
UNITED STATES PATENTS

| | | | |
|---|---|---|---|
| 750,108 | 1/1904 | Hanson | 82—36 |
| 3,039,342 | 6/1962 | Parsons et al. | 82—36 X |
| 3,051,029 | 8/1962 | Cashman et al. | 82—36 |

FOREIGN PATENTS

| | | |
|---|---|---|
| 177,037 | 12/1953 | Austria. |

WILLIAM W. DYER, Jr., *Primary Examiner.*

L. VLACHOS, *Assistant Examiner.*